United States Patent
Okuno

(10) Patent No.: US 6,496,615 B2
(45) Date of Patent: Dec. 17, 2002

(54) WDM TRANSMISSION SYSTEM

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 164 days.

(21) Appl. No.: 09/758,218

(22) Filed: Jan. 12, 2001

(65) Prior Publication Data

US 2001/0051017 A1 Dec. 13, 2001

Related U.S. Application Data

(60) Provisional application No. 60/236,173, filed on Sep. 29, 2000.

(30) Foreign Application Priority Data

May 22, 2000 (JP) ........................................ 2000-150313

(51) Int. Cl.[7] .............................................. G02B 6/28
(52) U.S. Cl. ........................ 385/24; 385/122; 385/123
(58) Field of Search ........................ 385/24, 122, 123, 385/27; 359/337.1

(56) References Cited

U.S. PATENT DOCUMENTS

| | | | | |
|---|---|---|---|---|
| 5,801,862 | A | * 9/1998 | Desurvire et al. | 359/124 |
| 6,233,387 | B1 | * 5/2001 | Berkey et al. | 359/115 |
| 6,263,138 | B1 | * 7/2001 | Sillard et al. | 385/123 |
| 6,377,391 | B1 | * 4/2002 | Vakoc et al. | 359/337.1 |
| 6,385,379 | B1 | * 5/2002 | Rousseau et al. | 385/123 |
| 6,430,346 | B1 | * 8/2002 | Conradi et al. | 385/123 |
| 2002/0041747 | A1 | * 4/2002 | Tirloni et al. | 385/123 |

FOREIGN PATENT DOCUMENTS

| | | |
|---|---|---|
| EP | 0 724 171 | 7/1996 |
| JP | 2001-51147 | 2/2001 |
| JP | 2001-100056 | 4/2001 |
| JP | 2001-166171 | 6/2001 |
| JP | 2001-166173 | 6/2001 |

OTHER PUBLICATIONS

Aikawa, et al., "New Dispersion–Flattened Hybrid Optical Fiber Link Composed of Medium–Dispersion Large Effective–Area Fiber and Negative Dispersion Fiber," 2001, Society Conference of the Institute of Electronics, Information and Communications Engineers No month.

Okuno, et al., "Optimum Dispersion of Optical Fiber for High Bit Rate Dense WDM Transmission Systems," 2001, Society Conference of the Institute of Electronics, Information and Communications Engineers, no month.

(List continued on next page.)

*Primary Examiner*—Ellen E. Kim
(74) *Attorney, Agent, or Firm*—McDermott, Will & Emery

(57) ABSTRACT

The invention relates to a WDM transmission system enabling high-speed and large-capacity optical transmission over the long haul. The WDM transmission system includes an optical transmission line for transmitting WDM signals in four or more channels with a channel spacing therebetween of not more than 0.4 nm and a bit rate of not less than 9 Gbit/s, and the optical transmission line has, as characteristics at a wavelength of 1.55$\mu$m, a chromatic dispersion with an absolute value is 8–16 ps/nm/km and a ratio ($n_2/A_{\mathit{eff}}$), which is a ratio of a nonlinear refractive index $n_2$ to an effective area $A_{\mathit{eff}}$, of not more than $6.4 \times 10^{-10}$/W.

13 Claims, 2 Drawing Sheets

OTHER PUBLICATIONS

Bigo, et al., "1.5 Terabit/s WDM Transmission of 150 Channels at 10Gbit/s over 4×100km of TeraLight™ Fibre.", 1999, ECOC, PD2–9, no month.

Ooishi, et al., "Non–Zero Dispersion Shifted Fiber for Wide Band WDM Transmission Including S–Band,", 2000, OECC 2000, pp. 12B3–4, 136–137, Jul.

"Transmission of 80×10 Gbit/s WDM channels with 50 GHz spacing over 500 km of LEAF® fiber", S. Tsuda et al., OFC2000, TuJ6 (2000), No month.

"Performance limits of nonlinear RZ and NRZ coded transmission at 10 and 40 Gb/s on different fibers", C. Fürst et al., OFC2000, WM31 (2000), No month.

"1.5 Terabit/s WDM transmission of 150 channels at 10Gbit/s over 4×100km of TeraLight™ fibre", S. Bigo et al., ECOC'99, PD2–9 (1999), No month.

"Experimental evaluation of TeraLight™ resistance to cross–nonlinear effects for channel spacings down to 50 GHz", S. Gurib et al., Electronics Letters, vol. 36, No. 11, May 25, 2000, pp. 959–961.

* cited by examiner

WDM TRANSMISSION SYSTEM

CROSS-REFERENCE TO RELATED APPLICATION

This application claims priority to Provisional Application Serial No. 60/236,173 filed on Sep. 29, 2000, which is hereby incorporated by reference in its entirety.

BACKGROUND OF THE INVENTION

1. Field of the Invention

The present invention relates to a WDM (Wavelength Division Multiplexing) transmission system for transmitting signals of a plurality of channels.

2. Related Background Art

WDM transmission systems enables high-speed and large-capacity optical transmission over the long haul by transmitting multiplexed signals (hereinafter referred to as WDM signals) of a plurality of channels. For high-speed and large-capacity optical transmission over the long haul in the WDM transmission systems, it is important to suppress deterioration of signal waveform due to the nonlinear optical phenomena in the optical transmission lines and it is also important to suppress deterioration of signal waveform due to accumulated chromatic dispersion of the optical transmission lines. A number of research and development has been conducted heretofore from these viewpoints.

For example, "S. Tsuda, et al., "Transmission of 80×10 Gbit/s WDM channels with 50 GHz spacing over 500 km of LEAF™ fiber," OFC2000, TuJ6 (2000)" (Document 1) reports the WDM transmission experiment carried out using nonzero-dispersion shifted optical fibers (NZ-DSFs) with chromatic dispersion of 4 ps/nm/km at the wavelength 1550 nm. "S. Bigo, et al., "1.5 Terabit/s WDM transmission of 150 channels at 10 Gbit/s over 4×100 km of TeraLight™ fiber," ECOC'99, PD2-9 (1999)" (Document 2) reports the WDM transmission experiment carried out using nonzero-dispersion shifted optical fibers with chromatic dispersion of 8 ps/nm/km at the wavelength 1550 nm.

"C. Furst, et al., "Performance limits of nonlinear RZ and NRZ coded transmission at 10 and 40 Gb/s on different fibers," OFC2000, WM31 (2000)" (Document 3) reports the computation result that at the bit rate of 10 Gbit/s or 40 Gbit/s, the nonzero-dispersion shifted optical fiber with the absolute value of chromatic dispersion of about several ps/nm/km at the wavelength 1.55 $\mu$m has a larger signal power margin than standard single-mode optical fibers having the zero-dispersion wavelength near the wavelength of 1.3 $\mu$m. This Document 3 also describes that the deterioration of signal waveform due to interaction between chromatic dispersion and self-phase modulation (SPM) being one of the nonlinear optical phenomena becomes prominent with increase in the absolute value of chromatic dispersion of the optical transmission line.

SUMMARY OF THE INVENTION

The inventors have studied the above prior arts in detail and, and as a result, have found problems as follows.

Namely, the above Documents 1 to 3 have reported the results of research for improvement in transmission performance of the WDM transmission systems. However, none clarified the optimum conditions of the WDM transmission systems for excellent transmission characteristics yet.

For example, when the absolute value of chromatic dispersion of the optical transmission lines is small (for example, about 4 ps/nm/km) as in the case wherein the nonzero-dispersion shifted optical fibers are used as optical transmission lines, since the quasi phase matching condition will be satisfied among the WDM signals if further increase of capacity is achieved by narrowing the channel spacing between the WDM signals (wavelength spacing between signal channels), there easily occurs the deterioration of signal waveform due to four-wave mixing (FWM) being one of the nonlinear optical phenomena. In addition, the signals also becomes more susceptible to cross-phase modulation (XPM), so that the waveform deterioration becomes much easier to occur.

On the other hand, when the absolute value of chromatic dispersion of the optical transmission lines is large (for example, about 20 ps/nm/km) as in the case wherein the standard single-mode optical fibers are used as optical transmission lines, since the WDM signals each keeping peak power high in a relatively long distance because of pulse compression propagate over the long haul in the optical transmission lines, there sometimes appears considerable deterioration of signal waveform due to not only the effect of FWM but also the interaction between SPM or XPM and chromatic dispersion. Since the absolute value of accumulated chromatic dispersion of the optical transmission lines becomes very large, a necessary dispersion compensation amount becomes larger, so as to raise difficulties in system design and increase the cost.

The present invention has been accomplished in order to solve the above problems and an object of the invention is to provide a WDM transmission system having a structure enabling high-speed and large-capacity optical transmission over the long haul.

A WDM transmission system according to the present invention includes an optical transmission line for transmitting WDM signals in four or more channels with a channel spacing therebetween of not more than 0.4 nm and a bit rate of not less than 9 Gbit/s. This optical transmission line is disposed between a transmitter and a receiver and, in addition, can be disposed at least one of between a transmitter and a repeater, between repeaters, and between a repeater and a receiver if one or more repeaters (including an optical amplifier, or the like) are disposed between the transmitter and the receiver.

Particularly, the optical transmission line has, as characteristics at a wavelength of 1.55 $\mu$m, a chromatic dispersion with an absolute value of 8–16 ps/nm/km and a ratio ($n_2/A_{eff}$), which is a ratio of a nonlinear refractive index $n_2$ to an effective area $A_{eff}$ of the optical transmission line, of not more than $6.4 \times 10^{-10}$/W. The optical transmission line preferably has a transmission loss of not more than 0.3 dB/km. By introduction of this optical transmission line to the WDM transmission system, a requirement level for system design can be decreased and a low-cost system having a stable transmission quantity construction can be easily constructed.

Accordingly, the WDM transmission system suppresses the deterioration of signal waveform due to the FWM, which can occur when the absolute value of chromatic dispersion of the optical transmission line is small, and suppresses the deterioration of signal waveform due to the interaction between chromatic dispersion and SPM or XPM, which can mainly occur when the absolute value of chromatic dispersion of the optical transmission line is large, so as to implement the high-speed and large-capacity optical transmission over the long haul.

In the WDM transmission system according to the present invention, the optical transmission line preferably has the chromatic dispersion with the absolute value of 9–14 ps/nm/km and more preferably 10–12 ps/nm/km. In these cases, particularly, the deterioration of signal waveform due to the FWM is sufficiently suppressed, and the deterioration of signal waveform due to the interaction between SPM or XPM and chromatic dispersion is sufficiently suppressed.

In the WDM transmission system according to the present invention, spectral efficiency is preferably not less than 0.1 bit/s/Hz and more preferably not less than 0.2 bit/s/Hz. In these cases the system enables large-capacity optical transmission and even in these cases, the deterioration of signal waveform can also be effectively suppressed when the WDM transmission system meets the aforementioned requirements. Here the spectral efficiency is defined as a ratio (bit rate/channel spacing) of the bit rate (unit: bit/s) to the channel spacing (unit: Hz) between the multiple channels for the WDM signals.

In the WDM transmission system according to the present invention, each repeater section by defining a setting interval between optical amplifiers, namely the optical transmission line disposed between a plurality of optical amplifiers during these optical amplifiers are disposed in the WDM transmission system, is preferably not less than 20 km and more preferably not less than 40 km. In these cases the system enables long-haul optical transmission and even in these cases, the deterioration of signal waveform can also be effectively suppressed.

The WDM transmission system according to the present invention can further comprises a dispersion compensator for compensating for chromatic dispersion of the optical transmission line at the wavelengths of the WDM signals. In this case, since the chromatic dispersion of the optical transmission line is compensated for by the dispersion compensator, the absolute value of accumulated chromatic dispersion of the whole including the optical transmission line and the dispersion compensator becomes small, so as to further suppress the deterioration of signal waveform. Preferably, when the dispersion compensator is provided every repeater section, adding or dropping of a part of signals can be easily performed in a repeater.

It is also preferable that a dispersion slope compensation ratio of the dispersion compensator is approximately 100%. Here the dispersion slope compensation ratio (unit: %) is defined as $100 \times (S_2/D_2)/(S_1/D_1)$, where $D_1$ is the chromatic dispersion of the optical transmission line, $S_1$ the dispersion slope of the optical transmission line, $D_2$ the chromatic dispersion of the dispersion compensator, and $S_2$ the dispersion slope of the dispersion compensator, at each wavelength of the WDM signals. In this case, the chromatic dispersion of the optical transmission line is compensated for by the dispersion compensator while the dispersion slope of the optical transmission line is also compensated for by the dispersion compensator. Therefore, a variation of each waveform deterioration of the WDM signals can be decreased and this enables signal transmission in a broad band.

In the WDM transmission system according to the present invention, the optical transmission line preferably has a polarization mode dispersion of not more than 0.2 ps·km$^{-1/2}$. In this case, the deterioration of signal waveform due to the polarization mode dispersion is suppressed, which is suitable for high-speed and large-capacity optical transmission over the long haul. When the WDM transmission system is provided with an optical amplifier, optical amplification can be implemented with stable gain for each of the WDM signals even if the gain of optical amplification for the WDM signals in this optical amplifier has polarization dependency.

In the WDM transmission system according to the present invention, each power of the WDM signals entering the optical transmission line is not less than 1 dBm. In this case, it is feasible to enhance the stability of the whole system because of expansion of the signal power margin and it is also feasible to decrease the number of optical amplifiers installed and thus decrease the cost because of increase of loss budget in transmission.

Further, at each wavelength of the WDM signals (in the multiple channels with channel spacing therebetween of not more than 0.4 nm and bit rate of not less than 9 Gbit/s), the optical transmission line preferably has a chromatic dispersion with an absolute value of 8–16 ps/nm/km. In this case, the waveform deterioration is suppressed throughout the entire signal wavelength band and thus the number of channel can be increased or decreased without cumbersome redesigning of the system.

In the WDM transmission system according to the present invention, the optical transmission line preferably has, at the wavelength of 1.58 $\mu$m, the chromatic dispersion with the absolute value of 8–16 ps/nm/km. In this case, not only in the 1.55 $\mu$m wavelength band but also in the 1.58 $\mu$m wavelength band, the system suppresses the deterioration of signal waveform due to the FWM, which can occur when the absolute value of chromatic dispersion of the optical transmission line is small, and also suppresses the deterioration of signal waveform due to the interaction between chromatic dispersion and SPM or XPM, which can occur when the absolute value of chromatic dispersion of the optical transmission line is large. As a result, this enables the higher-speed and larger-capacity optical transmission over the long haul.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

An embodiment of the present invention will be described hereinafter in detail with reference to FIGS. 1 to 3. In the description of the drawings the same elements will be denoted by the same reference symbols and redundant description will be omitted.

Figure 1:
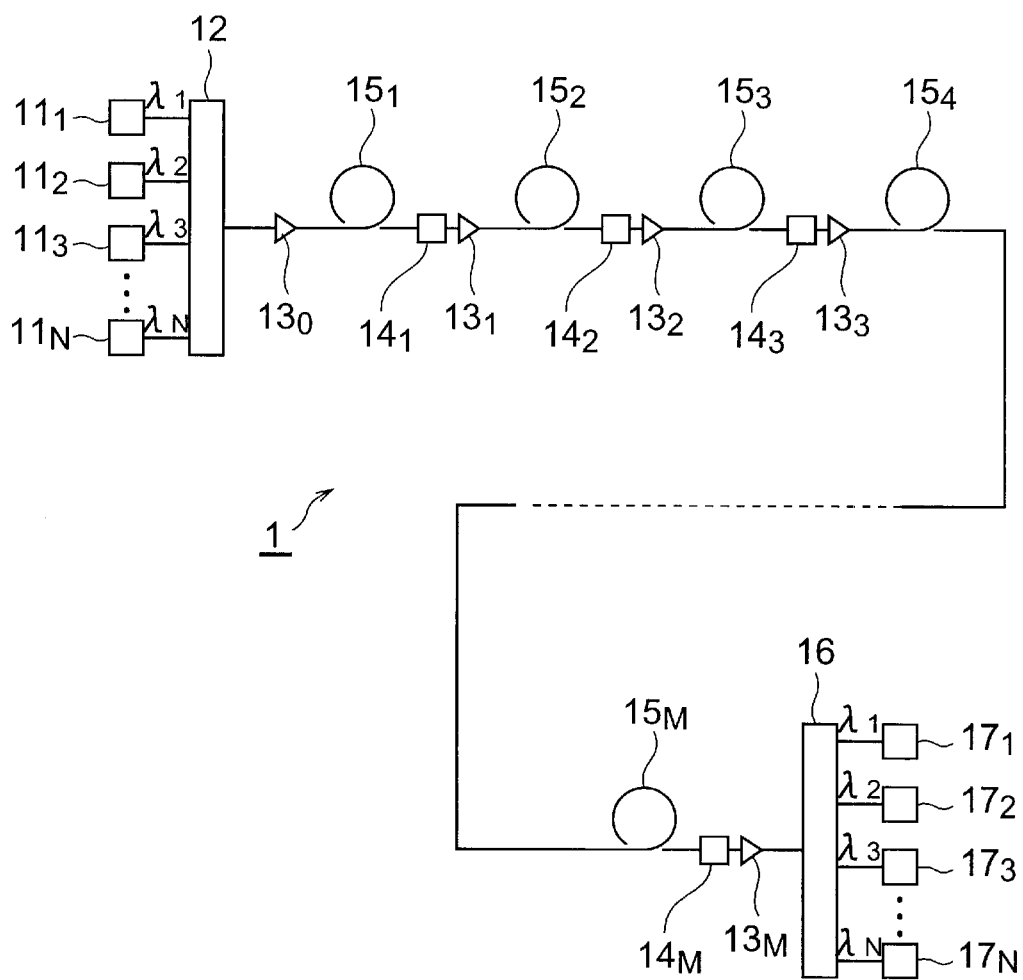
FIG. 1 shows a structural of an embodiment of the WDM transmission system according to the present invention.

FIG. 1 shows a structural of an embodiment of the WDM transmission system 1 according to the present invention.

This WDM transmission system 1 is provided with N transmitters $11_1$ to $11_N$, a multiplexer 12, optical amplifiers $13_0$ to $13_M$, M dispersion compensators $14_1$ to $14_M$, M optical transmission lines $15_1$ to $15_M$, a demultiplexer 16, and N receivers $17_1$ to $17_N$. Here N is an integer not less than 4 m and M an integer not less than 1. Unless stated otherwise, n is an arbitrary integer not less than 1 and not more than N, and m an arbitrary integer not less than 1 and not more than M hereinafter.

Each transmitter $11_n$ sends signals of the respective wavelength $\lambda_n$. Here the wave lengths $\lambda_1$ to $\lambda_N$ fall, for example, in the 1.55 μm wavelength band and satisfy the relation of $\lambda_n < \lambda_{n+1}$ ($1 \leq n < N$). Each of signal channels of of wavelength $\lambda_n$ has the channel spacing therebetween of not more than 0.4 nm (not more than 50 GHz) and the bit rate of not less than 9 Gbit/s.

The multiplexer 12 multiplexes the signals of the wavelengths $\lambda_n$ outputted from the respective transmitters $11_n$ and sends the WDM signals resulting from the multiplexing. The optical amplifier $13_0$ amplifies the WDM signals from the multiplexer 12 en bloc and sends them into the optical transmission line $15_1$. Each optical transmission line $15_m$ is an optical fiber for introducing the WDM signals amplified by and outputted from the optical amplifier $13_{m-1}$, to the dispersion compensator $14_m$, and the transmission loss of the optical fiber is preferably not more than 0.3 dB/km. Each dispersion compensator $14_m$ is an optical device for compensating for the chromatic dispersion of the optical transmission line $15_m$ in the signal wavelength band and it is, for example, an optical fiber device including a dispersion compensating optical fiber or an optical fiber grating. Each dispersion compensator $14_m$ accepts the WDM signals, having propagated through the optical transmission line $15_m$, and outputs dispersion-compensated WDM signals to the optical amplifier $13_m$.

Each optical amplifier $13_m$ amplifies the WDM signals from the dispersion compensator $14_m$ en bloc and outputs the amplified WDM signals to the optical transmission line $15_{m+1}$ ($1 \leq m \leq M-1$). The optical amplifier $13_M$ amplifies the WDM signals from the dispersion compensator $14_M$ en bloc and sends the amplified WDM signals to the demultiplexer 16. The demultiplexer 16 demultiplexes the WDM signals amplified by and outputted from the optical amplifier $13_M$ and outputs the demultiplexed signals of the respective wavelengths $\lambda_n$ to the associated receivers $17_n$. Each receiver $17_n$ receives the signals of the wavelength $\lambda_n$ from the demultiplexer 16.

In summary, in this WDM transmission system 1, the signals of the wavelengths $\lambda_n$ outputted from the respective transmitters $11_n$ are multiplexed by the multiplexer 12 as WDM signals and the WDM signals are amplified en bloc by the optical amplifier $13_0$. This amplified WDM signals of the multiple wavelengths $\lambda_1$ to $\lambda_N$ propagate through the optical transmission lines $15_1$ to $15_M$ in order. The WDM signals are compensated for dispersion by the dispersion compensators $14_1$ to $14_M$ while being amplified en bloc by the optical amplifiers $13_0$ to $13_M$ during the transmission. Thereafter, the WDM signals of the multiple wavelengths $\lambda_1$ to $\lambda_N$ reach the demultiplexer 16. Then the WDM signals reaching the demultiplexer 16 is demultiplexed by the demultiplexer 16 and is received by the receivers $17_1$ to $17_N$.

Figure 2:
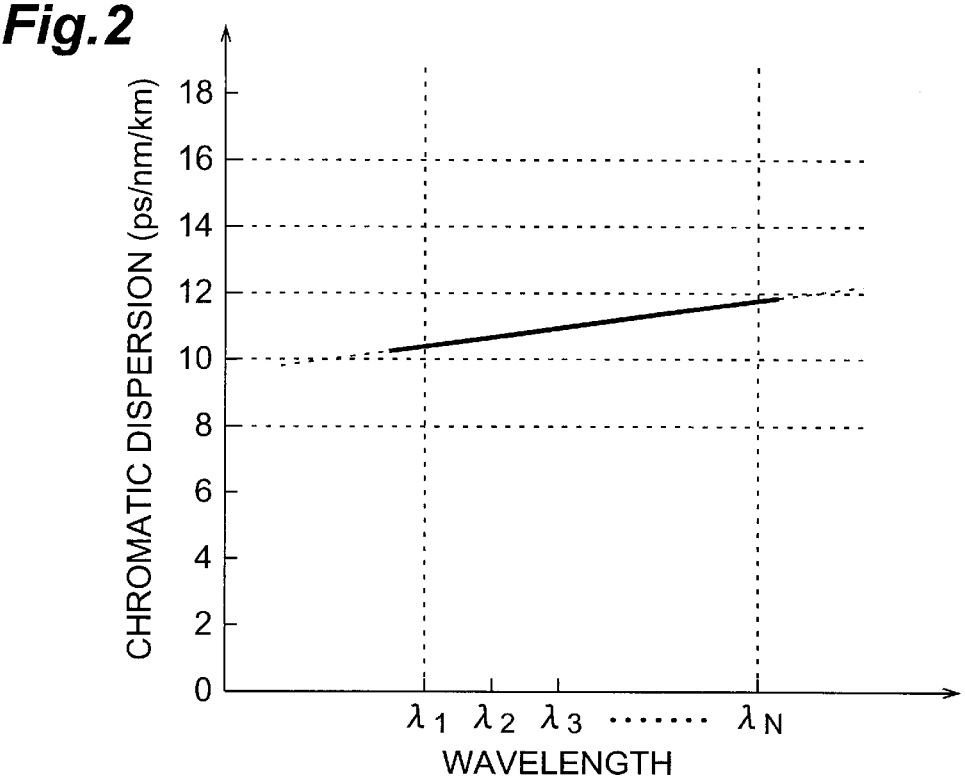
FIG. 2 shows a graph to explain the chromatic dispersion characteristics of the optical transmission line shown in FIG. 1.

FIG. 2 shows a graph to illustrate the chromatic dispersion characteristics of the optical transmission lines 15 shown in FIG. 1. At the wavelength 1.55 μm, the absolute value of chromatic dispersion of each optical transmission line $15_m$ is 8–16 ps/nm/km, more preferably 9–14 ps/nm/km, and still more preferably 10–12 ps/nm/km. If the absolute value of chromatic dispersion of each optical transmission line $15_m$ is smaller than this range, the deterioration of signal waveform due to the FWM will become easier to occur. If the absolute value of chromatic dispersion of each optical transmission line $15_m$ is larger than this range on the other hand, the deterioration of signal waveform due to the interaction between SPM or XPM and chromatic dispersion will become easier to occur. However, as long as the absolute value of chromatic dispersion of each optical transmission line $15_m$ is within this range, the system suppresses the deterioration of signal waveform due to the FWM and also suppresses the deterioration of signal waveform due to the interaction between SPM or XPM and chromatic dispersion, thereby enabling the high-speed and large-capacity optical transmission over the long haul.

At each of the wavelengths $\lambda_1$ to $\lambda_N$, the ratio ($n_2/A_{eff}$) of the nonlinear refractive index $n_2$ to the effective area $A_{eff}$ of each optical transmission line $15_m$ is not more than $6.4 \times 10^{-10}$/W. Namely, it is preferable to set the nonlinear refractive index $n_2$ smaller and the effective area $A_{eff}$ larger in order to suppress occurrence of the nonlinear optical phenomena in each optical transmission line $15_m$; therefore, the ratio ($n_2/A_{eff}$) is preferably set small. When the ratio ($n_2/A_{eff}$) is set to not more than $6.4 \times 10^{-10}$/W, occurrence of the nonlinear optical phenomena can be suppressed well in each optical transmission line $15_m$.

In addition, the aforementioned effective area $A_{eff}$ is given by the following equation, as described in Japanese Patent Application Laid-Open No. 8-248251 (EP0724171A2).

$$A_{eff} = 2\pi \left( \int_0^\infty E^2 r dr \right)^2 / \left( \int_0^\infty E^4 r dr \right)$$

In this equation, E represents the electric field caused by the propagating light and r the radial distance from the center of the core.

Further, the refractive index N of the medium under strong light varies depending upon the light intensity as described above. Therefore, the lowest-order effect on this index N is expressed by the following equation:

$$N = N0 + N2 \cdot |E|^2$$

where

N0: refractive index for linear polarization;

N2: second-order nonlinear refractive index for nonlinear polarization; and $|E|^2$: light intensity.

Namely, under strong light, the refractive index N of the medium is given by the sum of the normal value N0 and an increase proportional to the square of the amplitude E of the electric field of the light. Particularly, the proportional constant N2 of the second term (unit: $m^2/W$) is called the second-order nonlinear refractive index. Since distortion of signal pulses is affected mainly by the second-order nonlinear refractive index out of the nonlinear refractive indices, the nonlinear refractive index stated in the present specification mainly means this second-order nonlinear refractive index.

The spectral efficiency in the WDM transmission system 1 is not less than 0.1 bit/s/Hz and more preferably not less than 0.2 bit/s/Hz. Here the spectral efficiency is defined as a ratio (bit rate/channel spacing) of the bit rate (unit: bit/s) to the channel spacing (unit: Hz) between the multiple channels of the wavelengths $\lambda_1$ to $\lambda_N$. When the spectral efficiency is kept in this range, the system enables large-capacity optical transmission. In general, the influence of the FWM tends to become prominent in such cases of large spectral efficiency. In the this embodiment, however, the deterioration of signal waveform is suppressed, because each optical transmission line $15_m$ of the WDM transmission system 1 meets the above requirements concerning the chromatic dispersion and the ratio $(n_2/A_{eff})$.

In this WDM transmission system 1, the length of each repeater section sandwiched by the optical amplifier $13_m$, namely the length of each optical transmission line $15_m$, is not less than 20 km and more preferably not less than 40 km. When the length of each optical transmission line $15_m$ is set in such a range, the system enables long-haul optical transmission. In general, the influence of the nonlinear optical phenomena and the accumulated chromatic dispersion tends to become great in such long-haul cases. In the embodiment, however, the deterioration of signal waveform is suppressed, because each optical transmission line $15_m$ of the WDM transmission system 1 meets the above requirements concerning the chromatic dispersion and the ratio $(n_2/A_{eff})$.

This WDM transmission system 1 is provided with the dispersion compensators $14_m$ for compensating for the chromatic dispersion in the optical transmission lines $15_m$ at each wavelength of the WDM signals, whereby the chromatic dispersion of the optical transmission lines $15_m$ is compensated for by the dispersion compensators $14_m$, so as to decrease the absolute value of accumulated chromatic dispersion of the whole including the optical transmission lines $15_m$ and the dispersion compensators $14_m$, which further suppresses the deterioration of signal waveform. When the dispersion compensators $14_m$ are provided in the respective repeater sections as illustrated in FIG. 1, it becomes feasible, for example, to effect adding and dropping of signals at the repeaters.

The dispersion slope compensation ratio of each dispersion compensator $14_m$ is approximately 100%. Here the dispersion slope compensation ratio (unit: %) is defined as $100\times(S_2/D_2)/(S_1/D_1)$, where $D_1$ is the chromatic dispersion of the optical transmission line $15_m$, $S_1$ the dispersion slope of the optical transmission line $15_m$, $D_2$ the chromatic dispersion of the dispersion compensator $14_m$, and $S_2$ the dispersion slope of the dispersion compensator $14_m$, at the wavelengths of the WDM signals. In this case, the chromatic dispersion of the optical transmission line $15_m$ is compensated for by the dispersion compensator $14_m$ while the dispersion slope of the optical transmission line $15_m$ is also compensated for by the dispersion compensator $14_m$. Therefore, a variation of each deterioration of signal waveform of the respective wavelengths $\lambda_1$ to $\lambda_N$ is decreased and this enables signal transmission in a broad band.

In the WDM transmission system 1, the polarization mode dispersion of each optical transmission line $15_m$ is not more than 0.2 ps·km$^{-1/2}$. In this case, since the deterioration of signal waveform due to the polarization mode dispersion is suppressed, this also enables the high-speed and large-capacity optical transmission over the long haul.

In the WDM transmission system 1, each power of the WDM signals of the wavelengths $\lambda_1$ to $\lambda_N$ from each optical amplifier $13_{m-1}$ into the optical transmission line $15_m$ is not less than 1 dBm. In this case, the stability of the system can be enhanced because of expansion of the signal power margin and the number of optical amplifiers $13_m$ installed can also be decreased because of increase of the loss budget in transmission, thereby realizing reduction of cost.

Next described is a more specific structure of the WDM transmission system 1 according to the present invention. In this structure, the number N of channels for the signals to be multiplexed was 8 and the number M of repeater sections was 5. The multiple channels for the WDM signals have, in the 1.55-$\mu$m wavelength band, the channel spacing of 0.4 nm (50 GHz), the bit rate of 10 Gbit/s, and the spectral efficiency of 0.2 bit/s/Hz. Each power of the WDM signals of the wavelengths $\lambda_1$ to $\lambda_8$ from the optical amplifier $13_{m-1}$ into the optical transmission line $15_m$ was 4 dBm.

Each optical transmission line $15_m$ was an optical fiber, which had the length of 80 km, the transmission loss of 0.2 dB/km, the dispersion slope of 0.08 ps/nm$^2$/km at the wavelength 1.55 $\mu$m, and the nonlinear refractive index $n_2$ of $3.2\times10^{-20}$ m$^2$/W For each optical transmission line $15_m$, the chromatic dispersion at the wavelength 1.55 $\mu$m was in the range of 4 to 20 ps/nm/km, the effective area $A_{eff}$ in the range of 50 to 85 $\mu$m$^2$, and the ratio $(n_2 a_{eff})$ in the range of $3.8\times10^{-10}$ to $6.4\times10^{-10}$/W.

Each dispersion compensator $14_m$ was one completely compensating for both the dispersion slope and dispersion accumulated in one repeater section. The insertion loss was 1 dB and the nonlinear refractive index $n_2$ was ignored.

Figure 3:
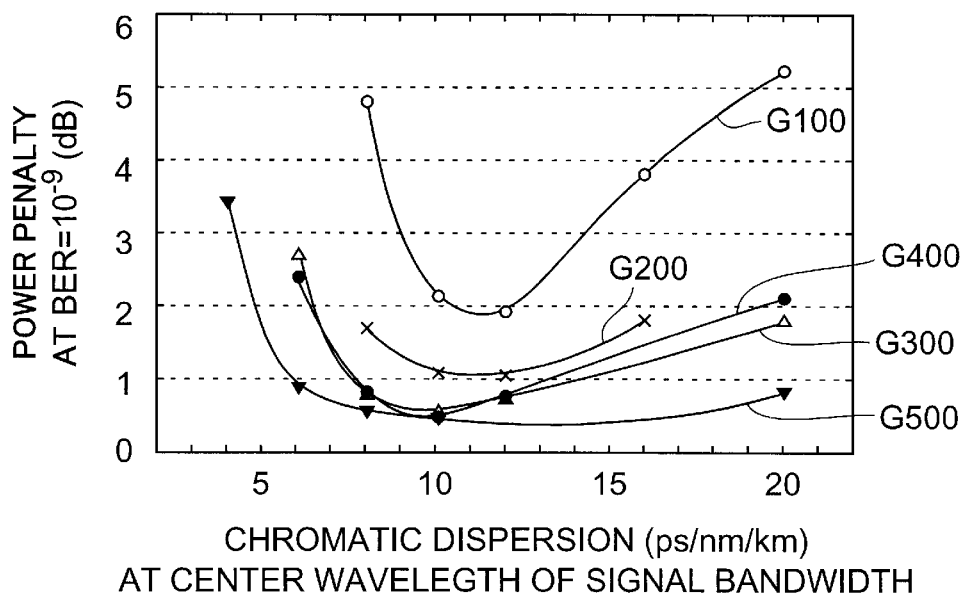
FIG. 3 shows a graph regarding to the respective relationships between chromatic dispersion and power penalty of a plural kinds of the WDM transmission system according to the present invention.

FIG. 3 shows a graph regarding to the respective relationship between chromatic dispersion and power penalty of the plurality kinds of the optical transmission lines in the WDM transmission system according to the present invention. In this graph, the axis of abscissa indicates the chromatic dispersion of each optical transmission line $15_m$ at the center wavelength within the range of the wavelengths $\mu_1$ to $\mu_8$ and the axis of ordinate the power penalty at the bit error rate of $10^{-9}$. The curve G100 indicates a measurement result of the optical transmission line having the effective area $A_{eff}$ of 50 $\mu$m$^2$, the curve G200 indicates a measurement result of the optical transmission line having the effective area $A_{eff}$ of 57 $\mu$m$^2$, the curve G300 indicates a measurement result of the optical transmission line having the effective area $A_{eff}$ of 64 $\mu$m$^2$, the curve G400 indicates a measurement result of the optical transmission line having the effective area $A_{eff}$ of 71 $\mu$m$^2$, and the curve G500 indicates a measurement result of the optical transmission line having the effective area $A_{eff}$ of 85 $\mu$m$^2$. The condition was the worst condition that the signals of the respective wavelengths $\lambda_1$ to $\lambda_8$ were pulse signals in the same polarization state and with the same bit pattern.

As can be understood from FIG. 3, within the above numerical ranges of the respective conditions, the power penalty is small where the chromatic dispersion of each optical transmission line $15_m$ is 8–16 ps/nm/km and the power penalty is much smaller where the chromatic dispersion of each optical transmission line $15_m$ is 9–14 ps/nm/km. When the chromatic dispersion of each optical transmission line $15_m$ is 10–12 ps/nm/km, the power penalty is not more than 2 dB, irrespective of the values of the effective area $A_{eff}$ of each optical transmission line $15_m$.

FIG. 3 shows the measurement result wherein each power of the WDM signals from the optical amplifier $13_{m-1}$ into the optical transmission line $15_m$ is 4 dBm, but the penalty can be improved by decreasing each power of the WDM signals into the optical transmission line $15_m$, for example, to below 1 dBm. However, since the signal power margin decreases with decrease of each power of the WDM signals into the optical transmission line $15_m$, it is not appropriate in terms of construction of practical systems. From the above, the upper limit of the ratio $(n_2/A_{eff})$ is $6.4\times10^{-10}$/W.

In the WDM transmission system having the above-mentioned structure, there was the difference of about 1 dB in the power penalty after transmission between in the case where in the polarization mode dispersion was 0.2 ps·km$^{-1/2}$ and in the case wherein the polarization mode dispersion was 0.3 ps·km$^{-1/2}$. Since the polarization mode dispersion over 0.2 ps·km$^{1/2}$ heavily affects the transmission characteristics, the polarization mode dispersion needs to be controlled to not more than 0.2 ps·km$^{-1/2}$.

At each wavelength of the WDM signals in the multiple channels with the channel spacing therebetween of not more than 0.4 nm and the bit rate of not less than 9 Gbit/s, the absolute value of chromatic dispersion of each optical transmission line $15_m$ is preferably 8–16 ps/nm/km. In this case, since the waveform deterioration is suppressed throughout the entire signal wavelength band, the number of channels can be increased or decreased at the repeater without cumbersome redesigning of the system.

At the wavelength 1.58 μm, the absolute value of chromatic dispersion of each optical transmission line $15_m$ is preferably 8–16 ps/nm/km. In this case, not only in the 1.55-μm wavelength band but also in the 1.58-μm wavelength band, the system suppresses the deterioration of signal waveform due to the FWM, which can occur when the absolute value of chromatic dispersion of the optical transmission line $15_m$ is small, and also suppress the deterioration of signal waveform due to the interaction between chromatic dispersion and SPM or XPM, which can occur when the absolute value of chromatic dispersion of the optical transmission line $15_m$ is large. This enables the higher-speed and larger-capacity optical transmission over the long haul.

In addition, the conditions in FIG. 3 can be generated by combining a few parameters. For example, the condition of the curve G100 is expressed by $(n_2/A_{eff})P=1.6\times10^{-12}$, because $n_2$ and P are assumed to be constant here. P is output power of the signal from the optical amplifier. If the ratio $(n_2/A_{eff})$ is constant and P is adjusted as $(n_2/A_{eff})P=1.6\times10^{-12}$, almost the same transmission property can be acquired as G100 in FIG. 3.

As detailed above, in accordance with the present invention, in the WDM transmission system including the optical transmission line for transmitting the WDM signals in four or more channels with the channel spacing therebetween of not more than 0.4 nm and the bit rate of not less than 9 Gbit/s, the optical transmission line has, as characteristics at the wavelength 1.55 μm, the chromatic dispersion with the absolute value of 8–16 ps/nm/km and the ratio $(n_2/A_{eff})$ of not more than $6.4\times10^{-10}$/W. By introducing the optical transmission line to the WDM transmission system, the deterioration of signal waveform due to the FWM, which can mainly occur when the absolute value of the chromatic dispersion of the optical transmission line is small, can be suppressed, and also the deterioration of signal waveform due to the interaction between chromatic dispersion and SPM or XPM, which can occur when the absolute value of chromatic dispersion of the optical transmission line is large, can be suppressed. This enables the high-speed and large-capacity optical transmission over the long haul. Use of this optical transmission line relaxes the requirements for the system designing of the WDM transmission system and facilitates the construction of an inexpensive, stable system.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A WDM transmission system for transmitting signals in four or more channels with a channel spacing therebetween of not more than 0.4 nm and a bit rate of not less than 9 Gbit/s, comprising an optical transmission line, as characteristics at a wavelength of 1.55 μm, having:

a chromatic dispersion with an absolute value is 8–16 ps/nm/km; and a ratio $(n_2/A_{eff})$, which is a ratio of a nonlinear refractive index $n_2$ to an effective area $A_{eff}$ of said optical transmission line, of not more than $6.4\times10^{10-10}$/W.

2. A WDM transmission system according to claim 1, wherein said optical transmission line has the chromatic dispersion with an absolute value is 9–14 ps/nm/km.

3. A WDM transmission system according to claim 1, wherein said optical transmission line has the chromatic dispersion with an absolute value is 10–12 ps/nm/km.

4. A WDM transmission system according to claim 1, wherein spectral efficiency in said WDM transmission system is not less than 0.1 bit/s/Hz.

5. A WDM transmission system according to claim 1, wherein spectral efficiency in said WDM transmission system is not less than 0.2 bit/s/Hz.

6. A WDM transmission system according to claim 1, wherein each repeater section defining a setting interval of optical amplifiers has a length of not less than 20 km.

7. A WDM transmission system according to claim 1, wherein each repeater section defining a setting interval of optical amplifiers has a length of not less than 40 km.

8. A WDM transmission system according to claim 1, further comprising a dispersion compensator for compensating for the chromatic dispersion of said optical transmission line at each wavelength of said signals.

9. A WDM transmission system according to claim 8, wherein a dispersion slope compensation rato of said dispersion compensator is approximately 100%.

10. A WDM transmission system according to claim 1, wherein said optical transmission line has a polarization mode dispersion of not more than 0.2 ps·km$^{-1/2}$.

11. A WDM transmission system according to claim 1, wherein power of each signal entering said optical transmission line is not less than 1 dBm.

12. A WDM transmission system according to claim 1, wherein at each wavelength of said signals of four or more channels, said optical transmission line has the chromatic dispersion whose absolute value is 8–16 ps/nm/km.

13. A WDM transmission system according to claim 1, wherein at a wavelength of 1.58 μm, said optical transmission line has the chromatic dispersion whose absolute value is 8–16 ps/nm/km.

* * * * *